United States Patent [19]

Mehmedbasich

[11] 3,715,368

[45] Feb. 6, 1973

[54] SULFONYL SUBSTITUTED TERPOLYMER FUEL DETERGENTS

[75] Inventor: Enver Mehmedbasich, El Cerrito, Calif.

[73] Assignee: Chevron Research Company, San Francisco, Calif.

[22] Filed: Feb. 16, 1970

[21] Appl. No.: 11,778

Related U.S. Application Data

[60] Continuation-in-part of Ser. No. 813,389, March 4, 1969, abandoned, which is a division of Ser. No. 603,787, Dec. 22, 1966, Pat. No. 3,405,952.

[52] U.S. Cl...........260/326.5 SM, 44/63, 260/326.3, 260/326.5 SF
[51] Int. Cl. .............................................C07d 27/10
[58] Field of Search.............260/326.5 SF, 326.5 SM

[56] References Cited

UNITED STATES PATENTS 2,504,098   4/1950   Morris et al.........................260/329

*Primary Examiner*—Alex Mazel
*Assistant Examiner*—Joseph A. Narcavage
*Attorney*—J. A. Buchanan, Jr., C. J. Toakin and B. G. Fehringer

[57] ABSTRACT

Terpolymer compositions of relatively low molecular weight having aliphatic 1-olefins of from about eight to 30 carbon atoms, N-substituted maleimides and olefins having a sulfone interrupted chain. The compositions find use as detergents in fuels.

6 Claims, No Drawings

SULFONYL SUBSTITUTED TERPOLYMER FUEL DETERGENTS

CROSS-REFERENCES TO RELATED APPLICATIONS

This application is a continuation-in-part of application Ser. No. 813,389, filed Mar. 4, 1969, and now abandoned, which is in turn a divisional of application Ser. No. 603,787, filed Dec. 22, 1966, and now U.S. Pat. No. 3,405,952.

BACKGROUND OF THE INVENTION

1. Field of the Invention

Fuels are susceptible to chemical reaction on aging. The effect of oxidation is to produce soluble and insoluble materials of higher molecular weight and boiling point than the original fuel. The deterioration due to oxidation and the like of distillate fuels, particularly in diesel fuel, manifests itself, for example, through the appearance of color and gums. The tacky oxidized fuel deposits adhere readily to injector parts and can cause injector sticking, nozzle hole plugging and leakage past critical surfaces.

Also, diesel engines are equipped with fuel filters to remove particulate matter from the fuel. Any gums which are present in the fuel tend to coat onto the filter requiring frequent changes of the filter in order to permit adequate fuel flow as well as effective filtering action.

While many materials might effectively act as commercially successful dispersants for the gum, the field is severely limited to relatively few materials. Since the dispersant is an additive to the fuel, it must not significantly increase the deposits created in the combustion chamber, which interfere with the proper functioning of the piston. In order to have an acceptable fuel dispersant, it is not only necessary that the dispersant maintain the gums dispersed in the fuel mixture, but the dispersant itself, when introduced into the combustion chamber, should not form deposits which significantly interfere with the operation of the piston.

2. Description of the Prior Art

Polymeric fuel detergents are disclosed in U.S. Pat. No. 3,413,104 which is a continuation-in-part of application Ser. No. 417,470, filed Dec. 10, 1964 and now abandoned. These polymers are relatively low molecular weight alternating copolymers of aliphatic 1-olefins of from about eight to 30 carbon atoms and N-substituted maleimides, where the substituent on the nitrogen has an amine nitrogen.

SUMMARY

The terpolymers of this invention have molecular weights of 2,000 to 15,000, and are composed of the following monomers:

A. 15 to 30 mole percent of a $C_5$–$C_{12}$ 1-olefin containing zero to one ethereal oxygen and a sulfocarbon group of two $C_1$–$C_7$ hydrocarbon radical linked by a sulfonyl radical, where the sulfocarbon group is bonded to the carbon chain of the olefin at a carbon which is at least beta to the internal olefinic carbon atom;

B. 35 to 20 mole percent of a $C_8$–$C_{30}$ aliphatic 1-olefin; and

C. about 50 mole percent of an N-substituted maleimide.

DETAILED DESCRIPTION OF THE INVENTION

The compositions of this invention are terpolymers of from 2,000 to 15,000 molecular weight, consisting essentially of:

A. from 15 to 30 mole percent of a 1-olefin consisting of:
1. five to 12 carbon atoms:
2. zero to one ethereal oxygen atoms, bonded solely to two carbon atoms which are not themselves bonded together; and
3. a functionality consisting of two $C_1$–$C_7$ hydrocarbon radicals joined by a sulfonyl radical, and bonded through one hydrocarbon radical to a carbon atom in the 1-olefin $C_5$–$C_{12}$ carbon chain which is at least beta to the internal olefinic carbon atom;

B. from 35 to 20 mole percent of an aliphatic $C_8$–$C_{30}$ 1-olefin; and

C. about 50 mole percent of an N-substituted maleimide.

A. The Sulfonyl-Containing $C_5$–$C_{12}$ Olefin

The $C_5$–$C_{12}$ 1-olefin to which the sulfonyl-containing functionality is bonded has the following formula:

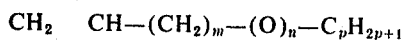

wherein $n$, $m$, and $p$ are all integers, with $m = 1$ to 9, $n = 0$ to 1, $p = 0$ to 8, and $m + p = 1$ to 9.

The functionality having two $C_1$–$C_7$ hydrocarbon radicals bonded together by a sulfonyl group will for brevity be herein termed the "sulfocarbon group." This has the structure

wherein R is a $C_1$–$C_7$ alkylene radical, R' is a $C_1$–$C_7$ alkylene or alkyl radical, and the total number of carbon atoms in the sulfocarbon group is two to eight.

The sulfocarbon group is bonded to the 1-olefin at a carbon which is at least beta to the internal olefinic carbon (i.e., the carbon designated C' in the formula $CH_2 = C'H - X$, where X represents the remainder of the 1-olefin molecule), where $n = 1$ and $p = 0$. The bonding may be through the ethereal oxygen atom by replacement of the hydrogen atom. The bonding of the sulfocarbon group is through the alkylene group R.

R and R' may be aliphatic alkyl or alkylene radicals, or they may be joined into a heterocyclic structure having as its only hetero atom the sulfur of the sulfonyl radical. The resulting heterocyclic sulfocarbon group will then have the following formula:

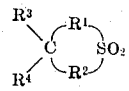

wherein $R^4$ is a bond or alkylene of from one to two carbon atoms, $R^3$ is hydrogen or methyl, $R^1$ and $R^2$ are each either a bond or alkylene with at least one being alkylene. The total number of annular carbon atoms is four or five (including the carbon atom to which $R^1$ and $R^2$ are bonded) and the sum total of the carbon atoms in $R^1$, $R^2$, $R^3$, and $R^4$ is an integer of from three to seven.

Usually when the sulfocarbon group is heterocyclic the 1-olefin will have the following formula

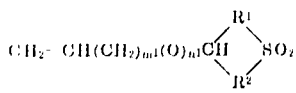

wherein $m^1$ is an integer of from 1 to 2, $n^1$ is an integer of from 0 to 1, $R^1$ and $R^2$ are each a bond or alkylene, at least one being alkylene, the total number of annular carbon atoms being four or five and the sum of the carbon atoms of $R^1$ and $R^2$ being in the range of three to seven. The annular carbon atoms may be substituted with lower alkyl groups of from one to three carbon atoms, e.g., methyl, ethyl, etc.

When the sulfocarbon group is aliphatic, R will be an alkylene radical of from one to seven carbon atoms, R' will be an aliphatic radical of from one to seven carbon atoms and the sum of the number of carbon atoms of R and R' will be an integer of from two to eight. R and R' may be straight or branched chain and will generally be free of aliphatic unsaturation, e.g., ethylenic and acetylenic unsaturation.

Typical examples of 1-olefins which are included within the scope of this invention include 1-pentene, 1-hexene, 10heptene, 1-nonene, 1-decene, 1-undecene, 1-dodecene, 1-tridecene, 3-methyl-1-decene, 5-ethyl-1-dodecene, 3-ethoxypropene, 3-isopropoxypropene, 4-methoxybutene, 5-methoxypentene, 6-ethoxyhexene, 10-methoxydecene, etc.

The sulfocarbon group may be the radical form of dibutyl sulfone, diethyl sulfone, dimethyl sulfone, methyl ethyl sulfone, diisopropyl sulfone, methyl butyl sulfone, 1,1-dioxotetrahydrothiophene(sulfolane), 1,1-dioxo-tetrahydrothiopyran, 1,1-dioxothiepane, 1,1-dioxo-3-methyl-tetrahydrothiophene, 3-(1-butenyl)hexyl sulfone, allyl octyl sulfone, etc.

B. The Aliphatic 1-Olefin

Aliphatic 1-olefins which may be used in this invention include straight chain and branched chain 1-olefins having from 8 to 30 carbon atoms. Typical examples are 1-octene, 1-dodecene, 1-hexadecene, 1-eicosene, 1-pentacosene, 1-triacontene, 8-methyl-1-tetradecene, 6-ethyldocosene, 8-methyldodecene, etc.

C. The N-substituted Maleimide

The N-substituent of the maleimide is an organic radical of from three to 60 carbon atoms, more usually of from three to 30 carbon atoms having from zero to five amine nitrogen and more usually from zero to one amine nitrogen. The substituent is free of aromatic unsaturation and may or may not have aliphatic unsaturation, e.g., ethylenic or acetylenic. Generally, there will be zero to two sites of aliphatic unsaturation in the substituent. In a preferred embodiment the substituent is an aliphatic radical of from eight to 24 carbon atoms with zero to one amine nitrogen interrupting the carbon chain. The nitrogen may be primary, secondary, or tertiary but will usually be secondary. Also, the nitrogen will usually be separated from the nitrogen of the maleimide by from about two to four carbon atoms.

Illustrative radical substituents on the nitrogen of the maleimide are aminohexyl, aminooctadecyl, N-hexylaminohexyl, N,N-diethylaminobutyl, N-octyl-3-aminopropyl, N-decyl-2-aminohexyl, N-dodecyl-2-aminoethyl, N-hexadecenyl-2-aminoethyl, N-octadecenyl-3-aminopropyl, N-eicosyl-3-aminopropyl, N-eicosyl-2-aminoethyl, N-octadecyl-3-aminopropyl, etc.

D. The Terpolymers

The polymers of this invention will have as their repeating unit a group of the following structure:

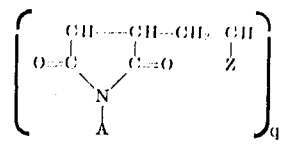

wherein A is the N-substituent on the maleimide described above; $q$ is an integer of from 4 to 20; and in 15 to 35 mole percent of the repeating units, Z is a radical of the following formula:

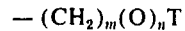

wherein T represents the hydrocarbon sulfonyl group described above, and $m$ and $n$ are as defined previously; and correspondingly in 85 to 65 mole percent of the repeating units, Z represents an alkyl radical of six to 28 carbon atoms. Thus, in 15 to 35 percent of the repeating units, Z is derived from the sulfocarbon group, and in the remainder it is derived from the $C_8$–$C_{30}$ aliphatic 1-olefin. In a preferred embodiment $q$ is an integer of from 6 to 16 and A is an aliphatic radical of from eight to 24 carbon atoms and 0 to 1 amino nitrogens.

The remaining two valences of the polymer will be satisfied in a variety of ways. One or both of the valences may be satisfied by a radical derived from the polymer initiator where the polymeric chain may terminate by transfer, coupling, or disproportionation resulting in alkyl groups, alkenyl groups, succinimidyl or maleyl groups.

The terpolymers will have number average molecular weights of from 2,000 to 15,000, more preferably from 4,000 to 10,000.

The compounds of this invention are readily prepared by copolymerizing a mixture of aliphatic 1-monoolefins and 1-olefins having a sulfonyl group interrupting the carbon chain (optionally having an ethereal oxygen present in the chain) in the desired proportions with maleic anhydride by means of free radical catalysts and then combining the resulting polymer with the desired amine at elevated temperatures to form the alternating N-substituted polysuccinimide.

Preferably, a mixture of olefins will be used rather than a single olefin. When using mixed olefins, superior fuel solubility is obtained. The mixture will generally have not more than 50 percent of any single olefin and preferably not more than 30 mole percent of any single olefin in the range of olefins used, usually the number of olefins in the mixture being from about three to 10 olefins.

The sulfonyl substituted olefin may be treated for the purposes of the polymerization as if it were an aliphatic 1-monoolefin and reference may be had to procedures in the art for the copolymerization of aliphatic 1-olefins with maleic anhydride. See, for example, U.S. Pat. No. 3,051,562.

The free radical catalyst may be any organic compound which at a temperature in the range of 50° to 100°C. decomposes to form free radicals which may then initiate the polymeric chain, although temperatures outside this range may be used advantageously under some conditions. The most popular organic free radical agents are the peroxidic initiators—hydroperoxide, dihydrocarbyl peroxide, and diacyl peroxide—and azo compounds. Illustrative of hydroperoxide catalysts are cumyl hydroperoxide, pinene hydroperoxide, tert.-butyl hydroperoxide, etc. Illustrative of dihydrocarbyl peroxides are dicumyl peroxide, ascaridole, di(tert.-butyl) peroxide, etc. Illustrative of diacyl peroxides are benzoyl peroxide, lauroyl peroxide, acetyl peroxide, 2,4-dichlorobenzoyl peroxide, etc.

In carrying out the various polymerizations, inert hydrocarbons or halohydrocarbons may be used as solvents to advantage. Illustrative of such solvents are benzene, toluene, chlorobenzene, etc.

Usually, the solvent will be from 20 to 80 weight percent of the total reaction mixture, more usually about 30 to 70 weight percent.

The mole ratio of 1-olefin (both sulfonyl containing and aliphatic hydrocarbon) to maleic anhydride will generally be about 0.9–1.2:1.2–0.9, more usually about 1:1. The ratio of maleic anhydride to catalyst will generally be 1:0.005–0.1 mole ratio, more usually 1:0.01–0.1 mole ratio.

As already indicated, the temperatures will depend upon the catalyst. Temperatures in the range of 50° to 100°C. may be used; more usually the temperature will be in the range of about 75° to 95°C. The time for the reaction will depend on the catalyst used, the amount of material, and the other variables. Generally, at least 1 hour will be required, and usually the reaction will not be carried out for more than a period of 24 hours.

Depending on the amount of the materials, the catalyst may be added in a single addition or in aliquot portions during the course of the reaction, maintaining a relatively constant concentration of free radicals in the reaction mixture.

The reaction of the copolymer with the relevant amine is readily carried out by combining the copolymer with the amine in an inert hydrocarbon solvent at elevated temperatures (50° to 150°C.) and removing the water as formed. Preferably, an aromatic hydrocarbon solvent is used which allows for azeotroping the water. When the stoichiometric amount of water has been obtained, the reaction is stopped.

The following examples are offered by way of illustration.

EXAMPLE A

Into a reaction flask fitted with a stirrer, condenser and thermometer was introduced 4.4 g. (0.025 moles) of allyl 3-sulfolanyl ether, 9.8 g. (0.01 mole) of maleic anhydride and 18.72 g. (0.075 mole) of cracked wax 1-monoolefin in the range of 15 to 20 carbon atoms and 64.8 g. of benzene. The mixture was heated while stirring to a temperature of 140°F. and 1 g. (0.004 mole) of benzoyl peroxide and a minimum of benzene added. The solution was then heated at 185°F. and maintained for 12 hours under a nitrogen atmosphere. The polymer was then isolated. Analysis: %S, 2.45, 2.49.

EXAMPLE I

Into a reaction flask was introduced 129.7 g. (0.1 mole) of a solution of the terpolymer prepared in Example A in benzene and 26.0 g. (0.1 mole) of oleyl amine. Xylene was added and the solution heated to 140°C. to azeotrope the water with benzene. When no further water came over, the resultant product was isolated.

Infrared analysis showed the presence of the imide band and the absence of the anhydride band.

EXAMPLE B

Into a reaction flask fitted with a stirrer, condenser and thermometer was introduced 8.8 g. (0.05 mole) of allyl 3-sulfolanyl ether, 9.8 g. (0.1 mole) of maleic anhydride, 12.15 g. (0.05 mole) of cracked wax 1-monoolefins in the range of 15 to 20 carbon atoms and 30.75 g. of benzene. The mixture was stirred at 140°F. and 1 g. (0.004 mole) of benzoyl peroxide in a minimum of benzene added. The solution was heated to and maintained at 185°F. for a period of 12 hours in a nitrogen atmosphere.

EXAMPLE II

To the benzene solution prepared above was added 32.4 g. (0.1 mole) of N-aminopropyl oleylamine, followed by the addition of 200 ml. of xylene. The mixture was headed to azeotrope off the benzene and water and 1 equivalent of water was obtained. The reaction was then stopped.

Infrared analysis of the final product showed the desired imide band.

The novel compositions of this invention find use, particularly with compression ignition engines, e.g., diesel engines. The compositions are readily compatible with a variety of fuels and may be prepared as concentrates or at concentrations to be used directly in the engine. As concentrates, concentrations in the range of 25 to 75 percent by weight find use, while in the engine, the additive concentration will be in the range from about 10 to 2,000 ppm, more usually in the range of about 25 to 250 ppm.

The base fuel which may be used, in accordance with the invention, may be a straight run or a cracked petroleum distillate; or a residual fuel; or it may be a fuel derived from shale; or one produced synthetically, for instance, by the Fischer-Tropsch process. It may also be a mixture of two or more of the aforementioned fuels. The base fuels used boil in the range from about 325° to 750°F. In other words, they are suitable for use in engines of the diesel type, and the like, frequently referred to as fuel oils.

In fuels containing naphthenic acids, the basic amine nitrogen of the polymeric compositions may form ammonium naphthenate salts. These salts are effective detergents and the formation of the naphthenate salts does not significantly affect the detergency of the compositions of this invention.

In order to demonstrate the excellent dispersancy of the compositions of this invention, the exemplary compositions were tested under two generally accepted tests which determine the acceptability of a composition as a dispersant.

An accelerated stability test comprises heating a sample fuel for 90 minutes at 300°F., cooling at ambient temperatures for 90 minutes, and then filtering through a Whatman No. 1 filter paper. The appearance of the deposits on the filter is rated by a reflectometer on a rating scale of 100 percent reflectance for a new white filter and 0 percent reflectance for a completely black filter.

A second stability test was carried out by heating the fuel for 20 hours at 200°F. The fuel was then cooled at ambient temperature for 24 hours and filtered through a tarred 5-micron pore size Millipore membrane filter. The filter is then weighed and the results are shown as parts per million of filter residue.

The fuel used was a 70 percent catalytically cracked light cycle oil plus 30 percent top-cut straight run. The following table indicates the results.

TABLE I

| Additive | Conc., ppm | 90 min. 300°F., % Reflectance | 20 hrs. 200°F., ppm |
|---|---|---|---|
| Ex. I | 50 | 59 | 4 |
|  | 100 | 67 | 2 |
| Ex. II | 50 | 79 | 3 |
|  | 100 | 84 | 2 |
| Base Fuel | — | 52 | 20 |

It is evident from the above data that the dispersants of this invention prevent the formation of material which would interfere with engine filters, keeping any sludges dispersed in the fuel, preventing their deposition.

The compounds of this invention are also found to provide excellent rust inhibition and good water tolerance. Therefore, the compounds of this invention provide a variety of improvements to fuels with a minimum, or absence of deleterious effects.

Other additives may also be included in the fuel in combination with the present additives; such additives include antioxidants, metal deactivators and cetane improvers.

As will be evident to those skilled in the art, various modifications on this invention can be made or followed, in the light of the foregoing disclosure and discussion, without departing from the spirit or scope of the disclosure or from the scope of the following claims.

I claim:

1. A terpolymer having a number average from molecular weight of from about 2,000 to 15,000 in which the repeating unit has the following general formula:

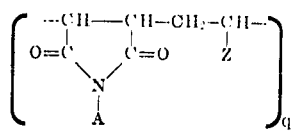

wherein

1. A represents an organic radical consisting essentially of radicals derived from hydrocarbyl aliphatic amines and aliphatic hydrocarbons, said organic radicals containing from three to 60 carbon atoms and from zero to five amine nitrogen atoms;

2. in 15 to 35 mol percent of the repeating units Z represents a radical of the formula

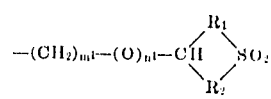

wherein:
a. $m^1$ represents 1 or 2;
b. $n^1$ represents 0 or 1; and
c. $R_1$ and $R_2$ each represent a bond or an alkylene group containing from one to four carbon atoms such that at least one of $R_1$ and $R_2$ represents an alkylene group, and the total number of anular carbon atoms in four or five; and in 85 to 65 mol percent of the repeating units Z represents an alkyl radical of from six to 28 carbon atoms; and 3. $q$ represents an integer of from about 4 to 20.

2. A terpolymer of claim 1 wherein said number average molecular weight is from about 4,000 to 10,000.

3. A terpolymer of claim 2 wherein $m^1$ and $n^1$ each represent 1.

4. A terpolymer of claim 3 wherein $R^1$ and $R^2$ together represent the atoms necessary to complete a sulfolanyl group.

5. A terpolymer of claim 4 wherein A represents an aliphatic organic radical containing from eight to 24 carbon atoms and one amine nitrogen atom and wherein said amine nitrogen is separated from the nitrogen of the succinimide by from two to four carbon atoms.

6. A terpolymer of claim 1 wherein A represents an aliphatic organic radical containing from three to 30 carbon atoms and from zero to one amine nitrogen atom.

* * * * *